United States Patent
Spruill

(10) Patent No.: US 6,543,751 B1
(45) Date of Patent: Apr. 8, 2003

(54) RAIL AND FENCE BRACKET APPARATUS

(76) Inventor: James F. Spruill, 4605 Sears Rd., Pegram, TN (US) 37143

( * ) Notice: Subject to any disclaimer, the term of this patent is extended or adjusted under 35 U.S.C. 154(b) by 187 days.

(21) Appl. No.: 09/643,613

(22) Filed: Aug. 22, 2000

(51) Int. Cl.$^7$ .............................................. E04H 17/24
(52) U.S. Cl. .................... 256/65.04; 403/403; 403/384; 256/65.06
(58) Field of Search ................ 256/67, 65.04, 256/59, DIG. 2, 24, 26, 65.03, 65.06; D8/380, 354; 403/376, 384, 403

(56) References Cited

U.S. PATENT DOCUMENTS

| | | | |
|---|---|---|---|
| 4,114,861 A | | 9/1978 | Long |
| 4,265,423 A | * | 5/1981 | Vecchiarelli ............... 248/264 |
| 4,280,686 A | | 7/1981 | Wack |
| 4,616,950 A | | 10/1986 | Morris |
| 4,825,621 A | | 5/1989 | Jensen |
| 5,186,571 A | | 2/1993 | Hentzschel |
| 5,190,268 A | * | 3/1993 | Espinueva .................... 256/67 |
| 5,238,321 A | | 8/1993 | Jarjoura |
| 5,265,837 A | * | 11/1993 | Marocco ..................... 248/264 |
| 5,547,169 A | * | 8/1996 | Russell ........................ 256/67 |
| 5,603,580 A | | 2/1997 | Leek et al. |
| 5,795,503 A | | 8/1998 | Krake |
| D409,078 S | | 5/1999 | Bolt |
| 5,961,242 A | * | 10/1999 | Leone ......................... 256/68 |
| 6,053,481 A | * | 4/2000 | Scheide ....................... 256/65 |

\* cited by examiner

*Primary Examiner*—Lynne H. Browne
*Assistant Examiner*—Kenn Thompson
(74) *Attorney, Agent, or Firm*—Waddey & Patterson; David Pieper; Phillip E. Walker

(57) ABSTRACT

A rail bracket apparatus for connecting a first rail and a second rail which includes a back piece, a bottom piece, and a bottom support system. The back piece includes screw attachment openings and the edges of the bracket are adapted to facilitate installation of a supported rail. An offset spacer is attached to the back piece to allow for air circulation around said supported piece. The bottom piece can be curved to support rounded rails and may include a water passage opening to allow for drainage. The bottom support system includes an angle bracket and the bracket joints are strengthened with fillets. Side pieces are provided for supporting and holding the installed rail. The unit may be designed with an engineered failure mode to allow for bracket failure to occur before a rail failure would occur. A rail retaining system may be used to retain the rail in position. A rail slot extension may be used to support the bracket in association with a rail cutout.

8 Claims, 12 Drawing Sheets

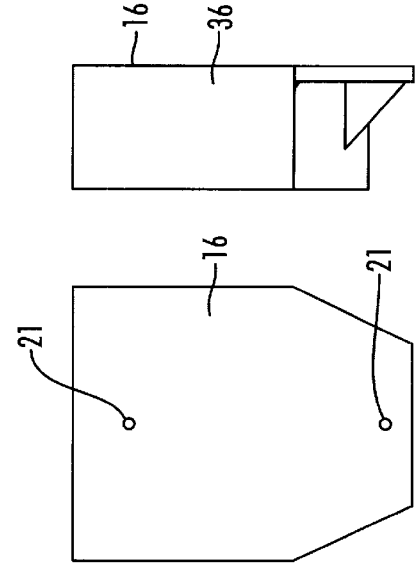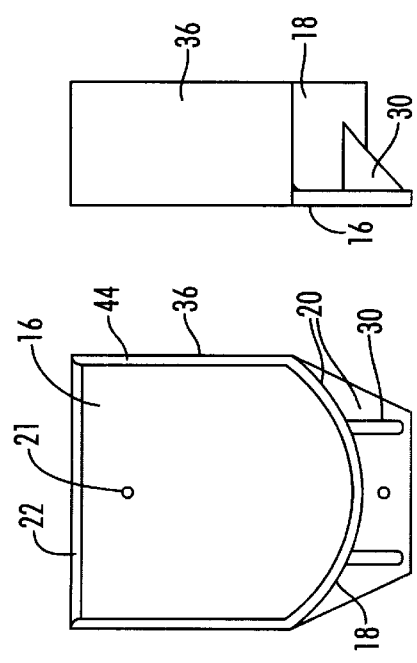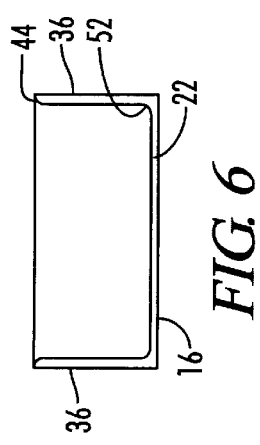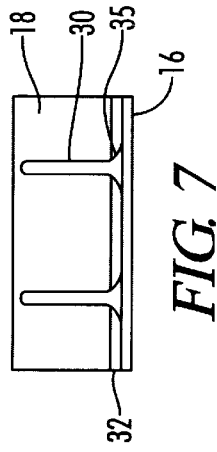
FIG. 5
FIG. 4
FIG. 3
FIG. 6
FIG. 2
FIG. 7

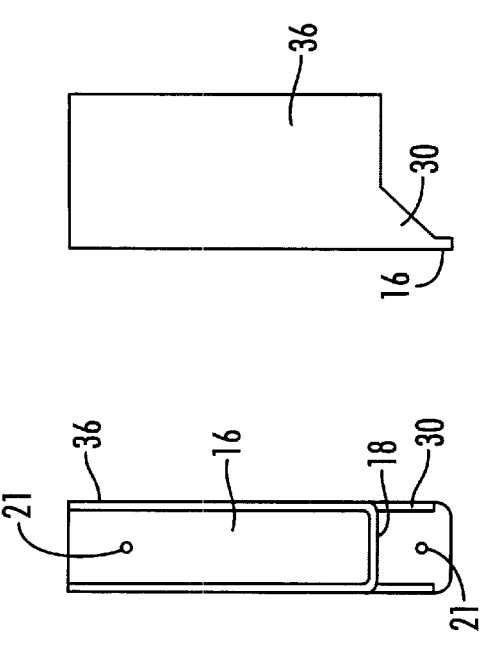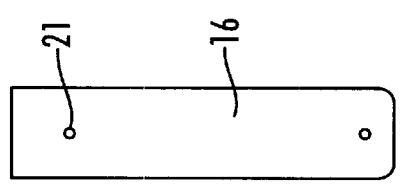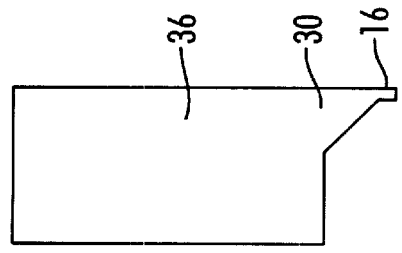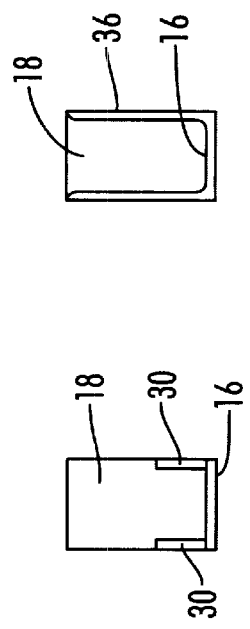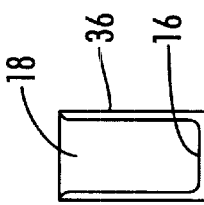

RAIL AND FENCE BRACKET APPARATUS

BACKGROUND OF THE INVENTION

The present invention relates generally to connectors and more particularly, this invention pertains to a bracket for the attachment of rails as performed in the construction of fencing. This bracket allows for the insertion, retaining, and removal of boards to allow for access through a fence.

Several United States Patents have been issued on fencing connectors and their designs. These patents include U.S. Design Pat. No. 409,078 issued to Bolt on May 4, 1999; U.S. Pat. No. 4,114,861 issued to Long on Sep. 19, 1978; U.S. Pat. No. 4,280,686 issued to Wack on Jul. 28, 1981; U.S. Pat. No. 4,616,950 issued to Morris on Oct. 14, 1986; U.S. Pat. No. 4,825,621 issued to Jensen on May 2, 1989; U.S. Pat. No. 5,186,571 issued to Hentzschel on Feb. 16, 1993; U.S. Pat. No. 5,238,321 issued to Jarjoura on Aug. 24, 1993; U.S. Pat. No. 5,603,580 issued to Leek et al. on Feb. 18, 1997; and U.S. Pat. No. 5,795,503 issued to Krake on Aug. 18, 1998. Each of these patents is briefly outlined in the following discussion and their disclosures are hereby incorporated by reference.

U.S. Design Pat. No. 409,078 issued to Bolt on May 4, 1999, discloses a Decorative Joint Hanger. This design patent teaches the manufacturing of a U-shaped bracket for hanging joists in construction.

U.S. Pat. No. 4,114,861 issued to Long on Sep. 19, 1978, discloses a Fence Rail Connector. This patent is directed towards a U-shaped strip of metal that is used to support a fence rail and attachment to a fence post. The design utilizes three nails for attaching the connector to the post and two connectors for attaching the bracket to the rail.

U.S. Pat. No. 4,280,686 issued to Wack on Jul. 28, 1981, discloses a Rail End Mounting Bracket. This patent also discloses a single strip of metal for attaching a fence rail to a post. The system utilizes a wave or kink to support the railing end. The straight portion of the connector is nailed into the end of the rail and a direct connection is made to the face of the fence post.

U.S. Pat. No. 4,616,950 issued to Morris on Oct. 14, 1986, discloses Timber Joining Devices. This patent discloses U-shaped channels which are used with a frame end to bolt a rail timber to another member.

U.S. Pat. No. 4,825,621 issued to Jensen on May 2, 1989, is directed towards a Holddown. This patent describes a system for holding a stud or other joint in association with a base plate as shown in FIG. 5. This patent does not disclose the use of this bracket for attaching fence rails to fence posts, but it does give a good description of the punching and manufacturing process for manufacturing the item disclosed in the patent.

U.S. Pat. No. 5,186,571 issued to Hentzschel on Feb. 16, 1993, discloses a Fence Rail Bracket. These brackets are specifically designed for the maximum and minimum cross sectional dimension of the fence rail. These brackets apply an upper, lower and first side attachment to the fence rail and a back plate attachment to the fence post.

U.S. Pat. No. 5,238,321 issued to Jarjoura on Aug. 24, 1993, discloses a Modular Construction System. This patent relies on a universal unit which has four rectangular planar surfaces for the attachment of vertical channels for attaching rails to posts.

U.S. Pat. No. 5,603,580 issued to Leek et al. on Feb. 18, 1997, discloses a Positive Angle Fastener Device. This patent discloses a method for attaching wood members such as floor joist to a base plate by allowing the joist to hang in a bracket assembly and driving nails through the joist at an angular relation.

U.S. Pat. No. 5,795,503 issued to Krake on Aug. 18, 1998, discloses a Fence Post and Rail Connector. This patent is directed towards a clamping system for attaching of rails to a concrete style post so that a screw or other device is not necessary to penetrate the concrete post.

What is needed, then, is a simple rail bracket for easy installation and joining of rails to posts for easy fence construction and access through a fence.

SUMMARY OF THE INVENTION

In accordance with the present invention, an improved bracket apparatus is provided which addresses the drawbacks of the prior art devices and in one of its exemplary forms includes a back piece, a bottom piece, and a bottom support system.

In accordance with one embodiment of the present invention, a fence rail bracket apparatus for connecting a rail and a post is provided which includes a back piece including screw attachment openings. A bottom piece is attached to the back piece, and an angle bracket is attached to the back piece and the bottom piece. First and second side pieces are attached to the back piece and bottom pieces for supporting the rail.

In accordance with another example of the present invention, a rail bracket apparatus is provided for connecting a first rail and a second rail which includes a back piece, a bottom piece, and a bottom support system. The back piece can be constructed from a continuous sheet of material or may be manufactured as hollowed sheet or web of material, and may include screw attachment openings for attachment to one of the rails.

In accordance with another example of the present invention, the edges of the bracket are adapted to facilitate installation of a supported rail by rounding, angling or otherwise directing a rail into the holding aperture of the bracket.

In accordance with yet another example, an offset spacer is attached to the bracket to allow for air circulation around said supported piece.

Other examples of the present invention include a bottom piece that is curved to support rounded rails and the inclusion of a water passage opening to allow for drainage.

One example of the present invention utilizes a bottom support system that includes an angle bracket and fillets for strengthening the bracket joints.

A further example of the present invention includes a rail retaining system for holding the rail within the bracket. Examples of advantageous elements of the rail retaining system include a flexible hinge which provides a smooth surface for insertion of the rail, a restraint for retaining a bracket cap in association with the bracket, a guidance element for properly aligning the cap with the bracket, and a water resistant seal for limiting water intrusion into the rail area.

A still further example of the present invention includes the use of external mounting holes for easy disconnection and removal of a bracket without removing the support rail.

Yet another example includes the construction of the cap from a semi-flexible material for allowing the cap to flex for insertion onto the bracket while maintaining sufficient rigidity to resist removal of the rail from the bracket.

A still further example of the present invention is the use of a rail restraining system which allows for connection of the cap to the bracket for restraint of the cap while allowing access for insertion or removal of the rail.

The principal object of the present invention is to provide an improved fence rail bracket for increased ease of installation and construction of a rail joint.

A further object of the present invention is the designing of a unit with an engineered failure mode to allow for bracket failure to occur before a rail failure would occur.

Other objects and further scope of the applicability of the present invention will become apparent from the detailed description to follow, taken in conjunction with the accompanying drawings wherein like parts are designated by like reference numerals.

BRIEF DESCRIPTION OF THE DRAWINGS

FIG. 2 is a front elevation of the rounded rail fence bracket apparatus of Applicant's invention.

FIG. 3 is a left side elevation of the rounded rail fence bracket apparatus of Applicant's invention, both sides being identical.

FIG. 4 is a back elevation of the rounded rail fence bracket apparatus of Applicant's invention.

FIG. 5 is a right side elevation of the rounded rail fence bracket apparatus of Applicant's invention, both sides of the case being identical.

FIG. 6 is a top view of the rounded rail fence bracket apparatus of Applicant's invention.

FIG. 7 is a bottom view of the rounded rail fence bracket apparatus of Applicant's invention.

FIG. 11 is a front elevation of the straight rail fence bracket apparatus of Applicant's invention.

FIG. 12 is a left side elevation of the straight rail fence bracket apparatus of Applicant's invention, both sides being identical.

FIG. 13 is a back elevation of the straight rail fence bracket apparatus of Applicant's invention.

FIG. 14 is a right side elevation of the straight rail fence bracket apparatus of Applicant's invention, both sides of the case being identical.

FIG. 15 is a bottom view of the straight rail fence bracket apparatus of Applicant's invention.

FIG. 16 is a top view of the straight rail fence bracket apparatus of Applicant's invention.

DESCRIPTION OF THE PREFERRED EMBODIMENTS

Figure 1:
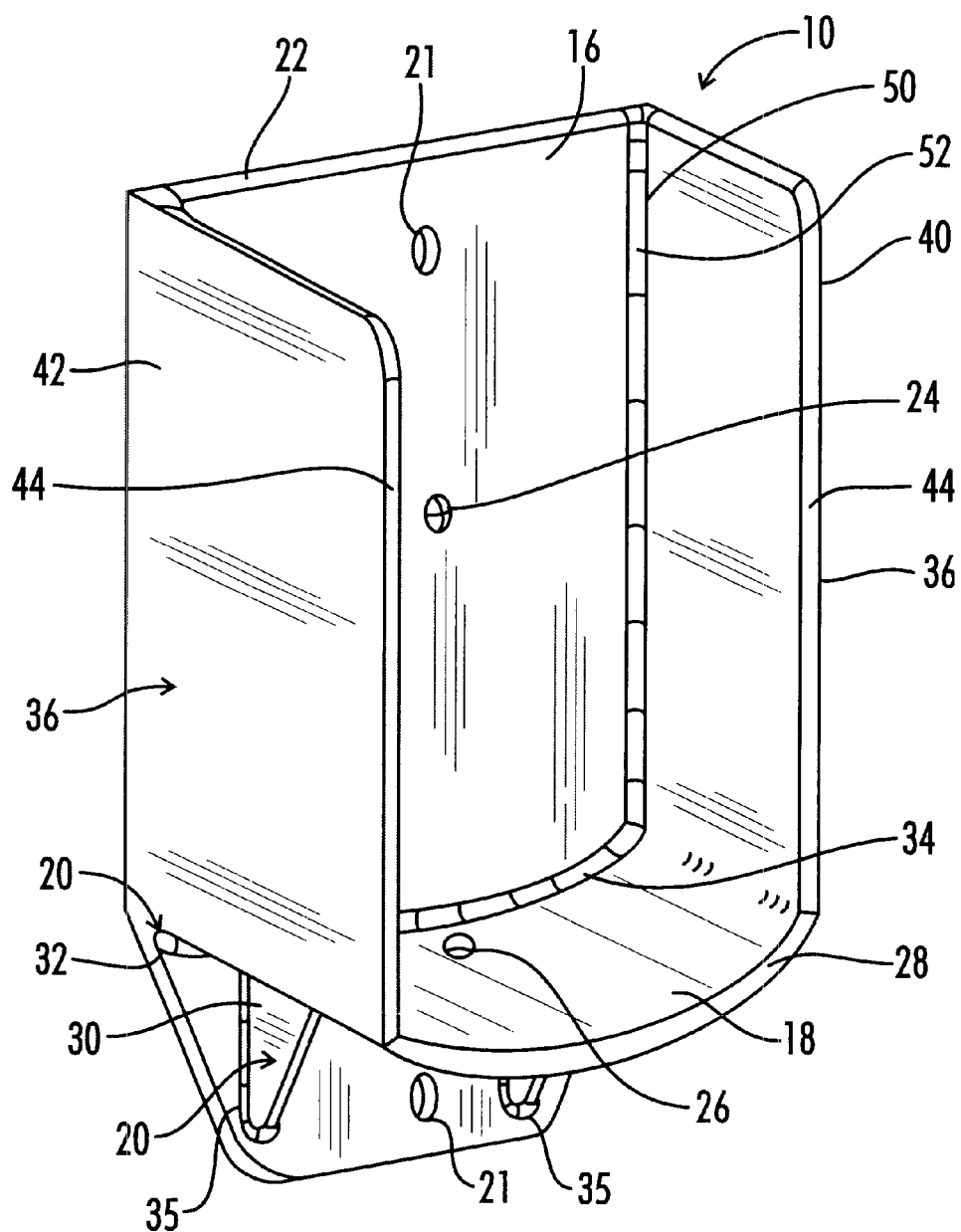
FIG. 1 is a front perspective view showing the rounded rail fence bracket apparatus of Applicant's invention.
Figure 8:
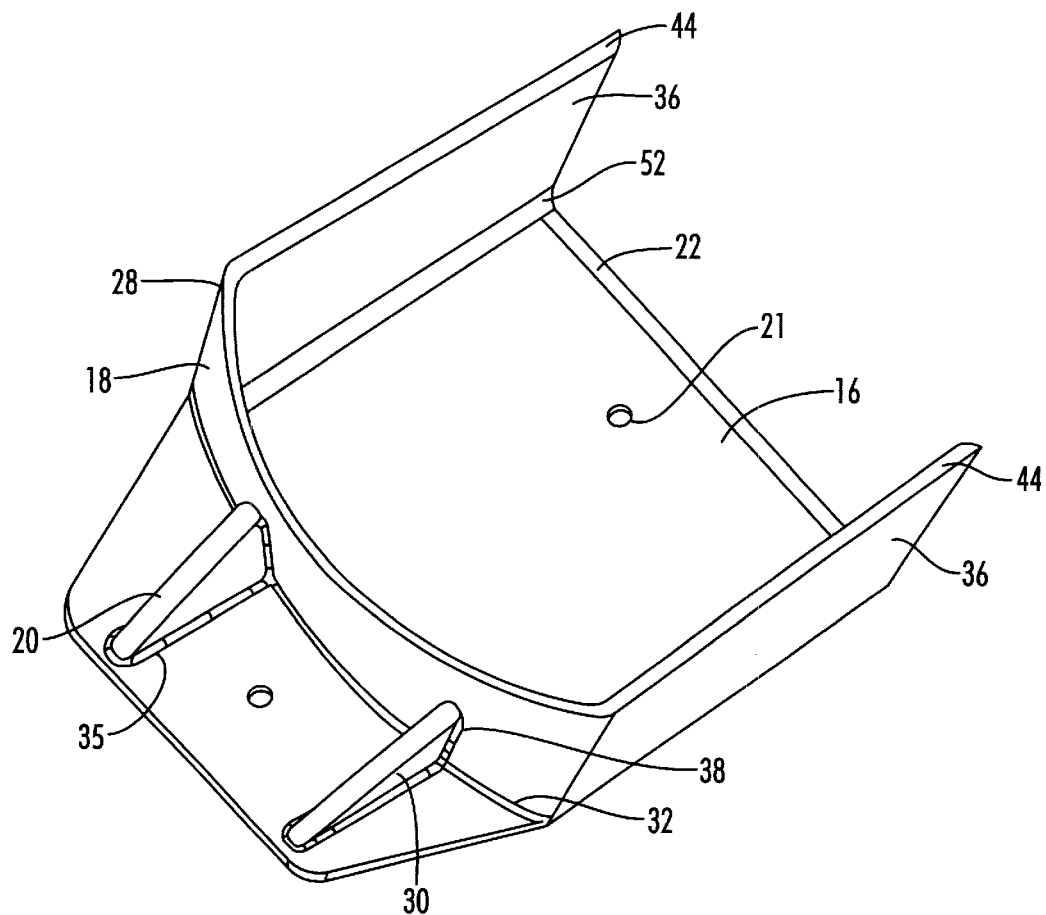
FIG. 8 is a bottom perspective view showing the rounded rail fence bracket apparatus of Applicant's invention.
Figure 9:
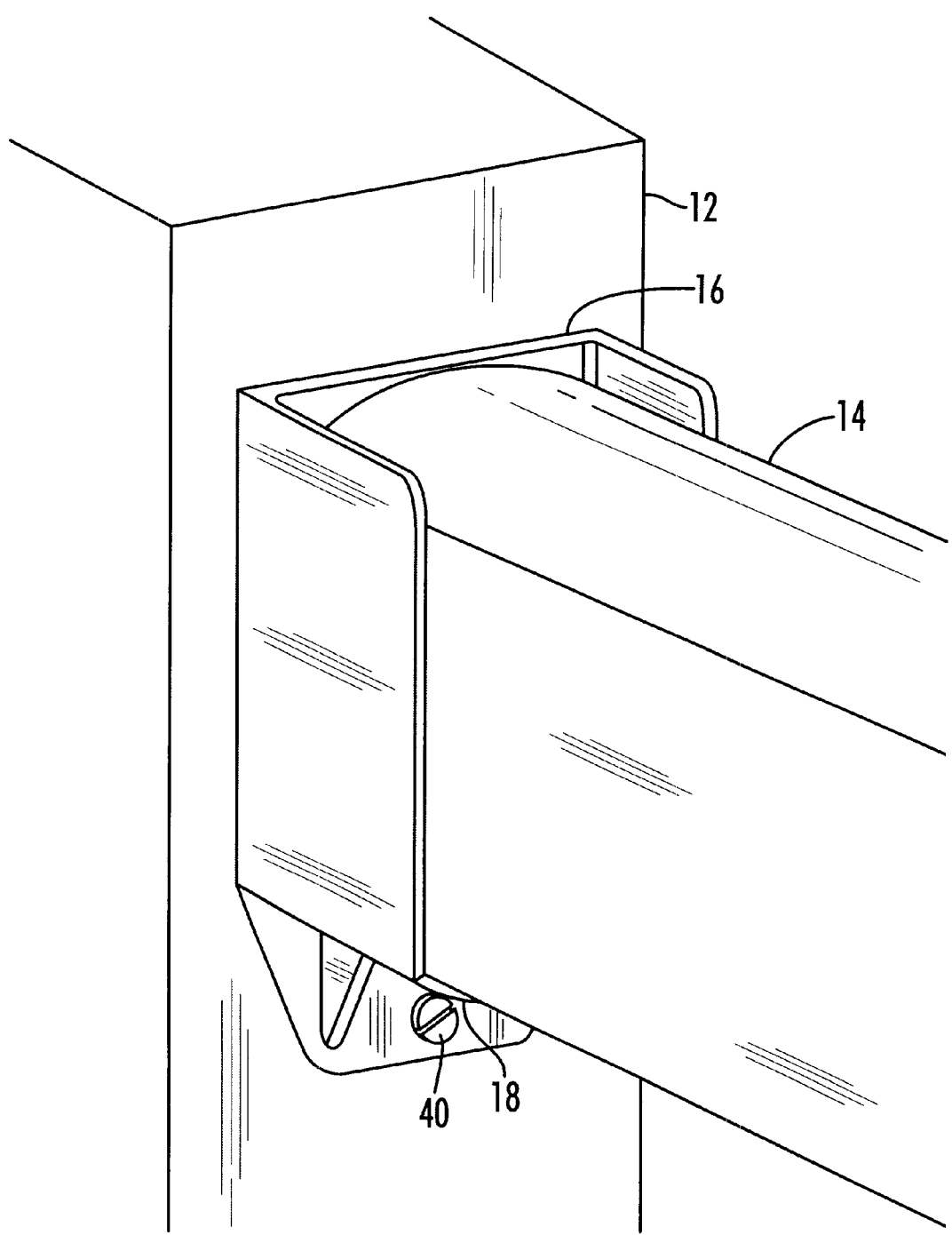
FIG. 9 is a perspective view of a two rail connection using the rounded rail fence bracket of the present invention.
Figure 10:
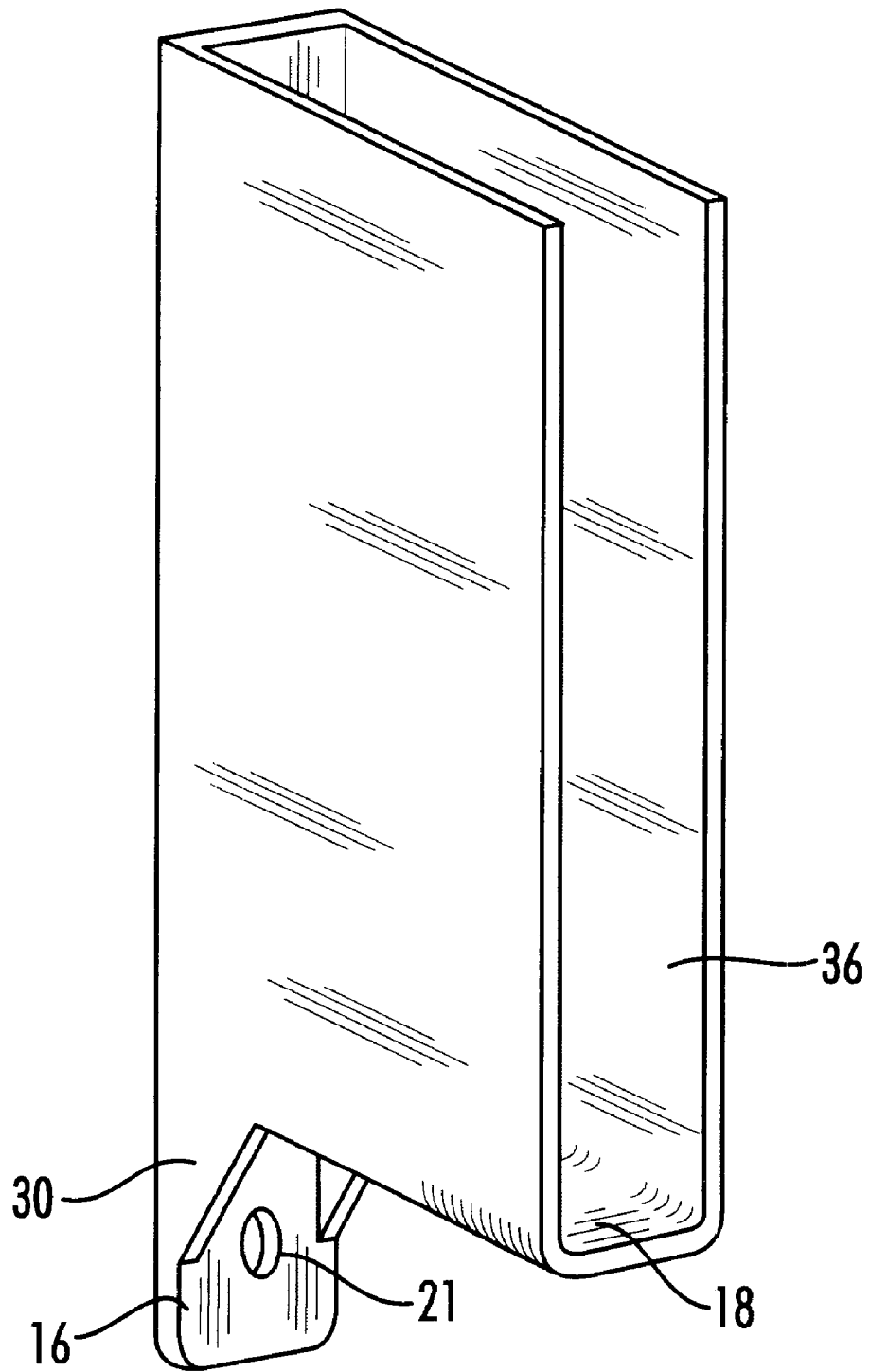
FIG. 10 is a front perspective view showing the straight rail fence bracket apparatus of Applicant's invention.
Figure 17:
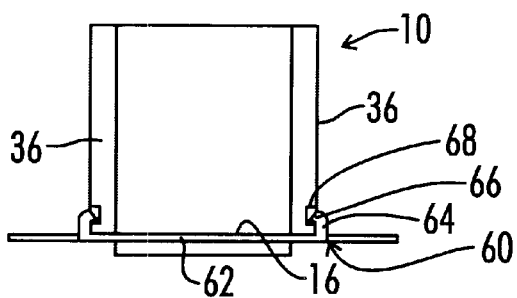
FIG. 17 is a top view of the molded rail fence bracket apparatus with the rail retaining system apparatus of Applicant's invention.
Figure 18:
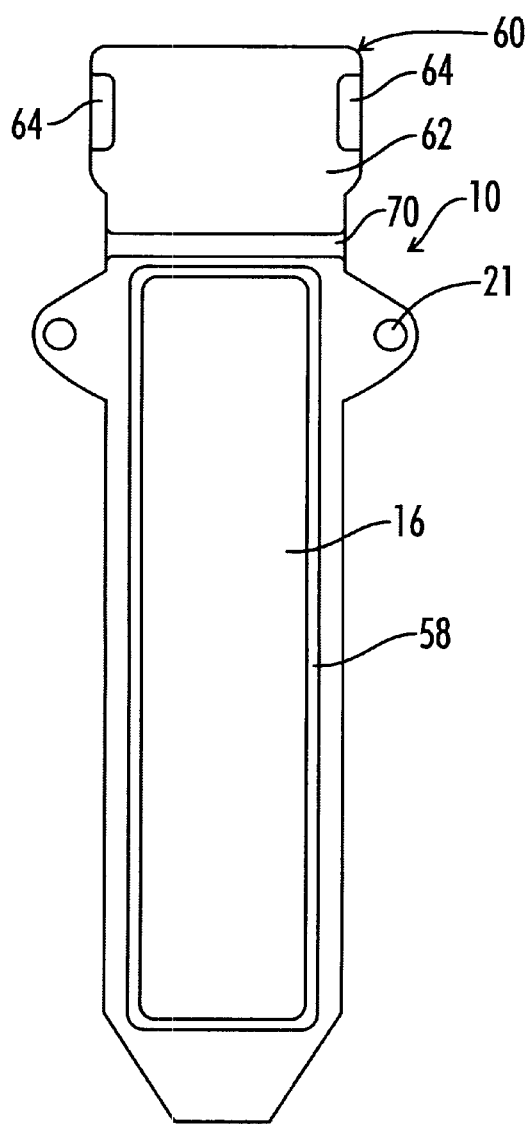
FIG. 18 is a back view of the molded rail fence bracket apparatus with the rail retaining system apparatus of Applicant's invention.
Figure 19:
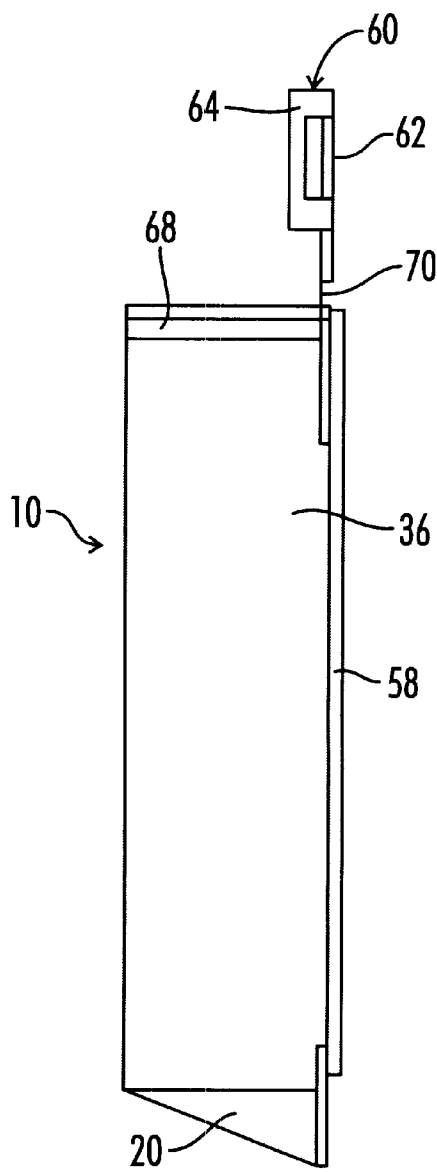
FIG. 19 is a right side view of the molded rail fence bracket apparatus with the rail retaining system apparatus of Applicant's invention.

In accordance with an exemplary embodiment of the present invention as shown in FIGS. 1–30, a fence rail bracket apparatus, device, or assembly 10 is shown in different embodiments. The rail bracket apparatus 10 is used for connecting a first rail 12 and a second rail 14. For the illustrative purposes, the first rail 12 will be described in a vertical use where the first rail is also known as a fence post 12. The second rail 14 will be described in a horizontal configuration where it is also known as a horizontal fence rail 14 in a standard fencing configuration. However, it is envisioned that this bracket may be used in other application for joining multiple rails together other than fencing.

The bracket apparatus 10 includes as major components a back piece 16, a bottom piece 18 attached to the back piece 16, and a bottom support system 20 attached to the back piece 16 and the bottom piece 18. FIGS. 1–9 are directed towards the use the bracket 10 for joining rounded rails commonly known as landscaping timbers and the associated styles of timber fencing systems. Landscaping timbers are characterized by standard measurements of cross section and curvature. FIGS. 9–30 are directed towards the post and board style of fencing system and as shown in FIGS. 9–18, the bracket 10 may be designed to handle the use of thinner boards as used in deck planking to reduce the material costs for fence construction. Deck planking is characterized by standard width and thickness measurements. FIGS. 19–30 are directed towards the extruded vinyl style of fencing with rail cutout posts and extended extruded fencing rails. The embodiment shown in FIGS. 19–30 utilizes a rail retaining system for keeping the rail within the bracket without the need for additional fasteners. It is also envisioned that the present invention may be manufactured for use with standard lumbar sizes or other boards, posts, and rails as appropriate.

With reference to FIG. 1 of the drawings, there is shown the basic embodiment of the fencing apparatus 10 consisting of a back piece 16, a bottom piece 18 attached to the back piece 16, and a bottom support system 20 attached to the back piece 16 and the bottom piece 18.

The back piece 16 includes screw attachment holes or openings 21. The screw attachment openings or hole 21 positions can be changed to provide greater strength for attaching the bracket 10 to the post. Also, additional screw holes 21 and screws may be added to increase the strength of the bracket 10 to post 12 attachment. Alternative embodiments of the back piece 16 can utilize a hollowed out center and move the screw attachment openings 21 to each side of the back piece 16 and closer to the side pieces 36. This can reduce the amount of material used to manufacture the bracket 10. An alternative to completely hollowing out the back piece 16 would be to use a web of plastic to form the back piece 16. This web would use less material, and allow quicker drying of the rails 12, 14 at the bracket 10 and the associated connection point after a rainstorm or other moisture causing event.

The back piece top edge 22 is adapted by rounding, angling, or forming to facilitate installation of a supported rail 14. The fence bracket apparatus 10 can also include an offset spacer or bump 24 that is attached to the back piece 16 to offset the supported rail 14 to allow for air circulation around the supported rail 14. These offset bumps 24 should be provided if a flush style of mounting screws 40 are to be utilized to attach the back piece 16 to the post 12. However, if non-flush mounting screws 40 are to be used, then the extension of the screw 40 head into the horizontal rail 14 mounting location will provide the same effect as the offset bumps 24 and thus, the bumps 24 may be eliminated form the bracket 10.

While the offset bumps 24 provide additional air circulation around the rails 12, 14, the bumps 24 can also create a leverage problem on the bracket 10. The offset bumps 24 space the horizontal rail 14 away from the back piece 16 and thereby increase the leverage of the horizontal rail 14 on the bracket 10. This additional leverage may be offset by additional bottom support 20 as described infra.

As shown in FIG. 1, the back piece 16 can extend below the bottom piece 18 to provide a back location for mounting a bottom support 20 including lower back-bottom fillet 32 or an angle bracket 30. An alternative embodiment will allow for the back piece 16 to extend beyond the sides 36 to allow for additional angle brackets or fillets for the side pieces 36.

As shown in FIGS. 1–8, the bottom piece 18 may be curved to support rounded rails or the bottom piece 18 may also be straight as shown in FIGS. 9–30. The bottom piece 18 may include a water passage opening 26. The bottom piece front edge 28 is adapted to facilitate installation of a supported rail 14. The bottom piece front edge 28 is adapted by rounding, angling, or forming such that the bottom piece edge 28 will direct the horizontal rail 14 into the bracket 10. For maximum strength, the horizontal rail 14 or supported rail 14 should sit directly on bottom piece 18, however, the offset bumps 24 may also be used on the bottom piece 18 to allow for air circulation along the bottom of the horizontal rail 14.

The bottom support system 20 includes an angle bracket 30, an upper bottom-back fillet 34, and a lower bottom-back fillet 32. Each of these supporting elements may be utilized separately to provide support for the bottom piece 18, or they may be combined in various configurations to allow for differing amounts of support for the bottom piece 18. For example, the angle bracket 30 may be removed and large lower fillet 32 can be utilized to provide sufficient strength to the bracket 10. The preferred embodiment utilizes dual angle supports 30 to maximize the support while reducing the overall material usage. The thickness of the bottom support system 20 and the distance of the extension of the bottom support 20 onto the bottom piece 18 from the back piece 16 is chosen to maximize the support for the bottom piece 18 and the corresponding horizontal rail 14. This calculation of the extension distance should also consider the amount of material used and an efficient design will provide sufficient strength while minimizing the amount of material being used.

Additional support for the angle brackets 30 is provided by the back-angle support fillet 35 which is attached to the back piece 16 and the bottom support angle 30. The angle 30 is also provided further support by a bottom-support fillet 38 attached to the bottom piece 18 and the bottom support angle 30.

Also shown in FIGS. 1 through 30 are the side pieces 36. The first 40 and second 42 pieces are attached to the back piece 16 and the bottom piece 18. The outer edge 44 of the side pieces 36 is adapted to facilitate the installation of a supported rail 14 by providing a guiding edge for the horizontal rail 14. This guiding edge is formed by rounding, angling, or otherwise providing an inwardly disposed surface. The side pieces 36 are generally constructed to be perpendicular to the bottom piece 16. However, the side pieces 36 may be outwardly angled to make installation of the horizontal rail 14 easier. In the preferred embodiment, the side pieces 36 are inwardly angled from the back piece 16 to tensionally hold and support the horizontal rail 14.

These side pieces 36 may be designated as a first side piece 40 and a second side piece 42, although either side may be called the first side piece 40 if only one side piece 36 is to be used. Additionally, a rail bracket apparatus 10 could be manufactured without side pieces 36 on either the left or right side of the bracket 10. This would allow for a horizontal rail 14 to post 12 junction without the look or interference of the fence bracket 10 on the side of the horizontal rail 14. The bracket 10 can also be manufactured with just a first side piece 40 on either one of the sides of the bracket 10. This would allow for additional support for the horizontal rail 14 and still allow for one side of the fence to have the horizontal rail 14 to post 12 connection without the look of the bracket 10. However, the preferred embodiment of the invention uses both the first 40 and second 42 side pieces 36 to provide the greatest support for the horizontal rail 14 to post 12 connection.

The attachment of the side pieces 36 to the back piece 16 may be strengthened by a side support system 50 attached to the back piece 16 and the side piece 36. By extending the back piece 16 sideways beyond the side pieces 36 an angle bracket as previously described for the bottom support 18 may be used for additional side piece 36 support. The preferred embodiment only uses a side piece fillet 52 on the inside of the side pieces 36 to provide the additional strength. This has been found to provide sufficient strength for most of the bracket's 10 intended installations.

The size of the side support fillet 52 may be varied to change the strength of the connection between the side pieces 36 and back piece 16. When determining the size of the side support fillet 52 from the back piece 16 to the side piece 36, one should maximize the support without exceeding the screw head spacing distance. The screw head spacing distance is the distance into the bracket 10 from the back piece 16 that is occupied by a screw head, bolt head or other attachment means that are used to attach the back piece 16 to the post 12.

Screws 40 may be driven through either of the first side piece 40, second side piece 42, back piece 16 or bottom piece 18 and into the horizontal rail 14. The preferred embodiment for the bottom 18 and side pieces 36 does not supply screw holes so that any number of screws 40 may be utilized. This simplifies the molding process and allows for the user of the bracket 10 to determine the placement and number of screws 40 for the particular design situation. However, it is envisioned that a screw hole can be provided in the bottom 18 and side pieces 36 with similar design considerations for the screw attachment openings 21 placed in the back piece 16. This can also be accomplished as shown in FIGS. 17–30 which show ear extensions 23 with screw attachment openings 21 for placement of the screws 40 outside of the side pieces 36. This allows for a smooth interior for easy insertion of the rail 14. The preferred embodiment of the bottom 18 and side pieces 36 does not utilize offset bumps 24 or spacers because the design utilizes the snug fit of the timber rail 14 in the bottom 18 and side pieces 36 for additional strength. However, offset bumps 24 may be utilized if desired on both the bottom 16 and side pieces 36.

The preferred embodiment of the invention provides a fence rail bracket apparatus 10 for connecting a rail 14 and a post 12. This apparatus includes a back piece 16 with screw attachment openings 21 and two sides 36. A bottom piece 18 is attached to the back piece 16. One edge of the bottom piece 18 is attached to the back piece 16 and two ends of the bottom piece 18 are connected to two side pieces 36. An angle bracket 30 is attached to the back piece 16 and the bottom piece 18 for additional support and a first side piece 40 is attached to a first side of the back piece 16 and the first end of the bottom piece 18. A second side piece 42 is attached to the second side of the back piece 16 and the second end of the bottom piece 18. This design is constructed from a semi-flexible and strong plastic which provides for the necessary strength characteristics for a designed failure mode.

The selected plastic has allowed for an unexpected result of allowing a selective failure mode for the landscape timber style of bracket 10 as shown in FIGS. 1–9. By designing the bracket 10 with the two holes 21 as shown, the screws 40 may be selected to allow for the bracket 10 to fail before the screws 40 or cross-timber 14 fails. The preferred embodiment utilizes two #10, washer head style, 1⅜" long self-tapping wood screws 40. When using these screws 40, the bracket 10 will fail through a tear out of the plastic surrounding the screw hole 21 areas. This allows for an easy fence repair because the timbers 12, 14 will still be intact. Thus, the repair only requires replacing the bracket 10 and does not require replacement of the rail 14 or the post 12. As a further advantage, the same screws 40 may be utilized by removing them from the post 12, clearing the old plastic, and installing the new bracket 10. Thus, a field repairman only needs to carry the screwdriver and a new bracket 10 to repair a fence section.

An additional feature of the tear our design allows for the fencing system to fail at a pre-determined pressure for cases of an animal or other object landing on top of the fence rail. The bracket 10 is designed to fail just below the strength of the post 12 and rail 14 landscape timber so that a strong fence is constructed, but the failure mode of the fence can be controlled to save the timbers. As an alternative to the designed failure mode of the bracket, a small screw size may be selected to allow for the screw failure while protecting the integrity of the bracket and rail. A further design may utilize a rigid plastic and/or place multiple screws 40 closer to each side rail to allow for the timber failure to occur before the bracket 10 failure.

As shown in FIGS. 17–30, another embodiment of the design allows for the use of the bracket in the extruded vinyl style of fencing These figures show the molded rail fence bracket apparatus 10 with the rail slot extension 58 and the rail retaining system apparatus 60 of Applicant's invention.

Figure 27:
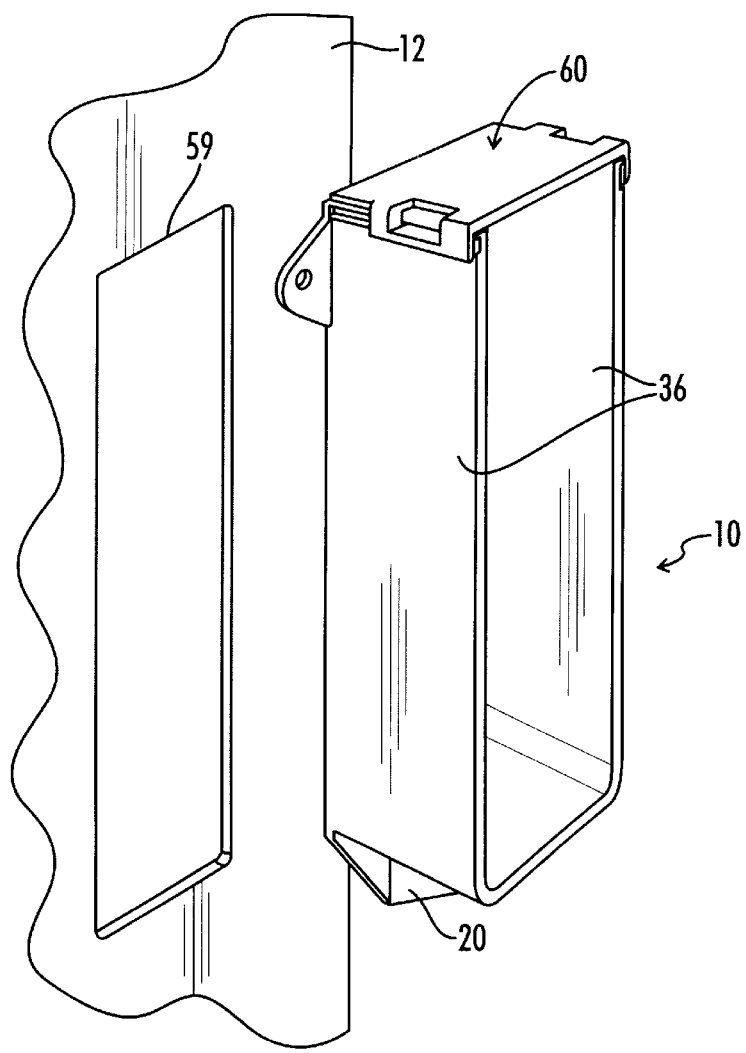
FIG. 27 is an isometric view of the molded rail fence bracket apparatus with the rail retaining system apparatus of Applicant's invention showing the mounting location on a cutout post system.
Figure 28:
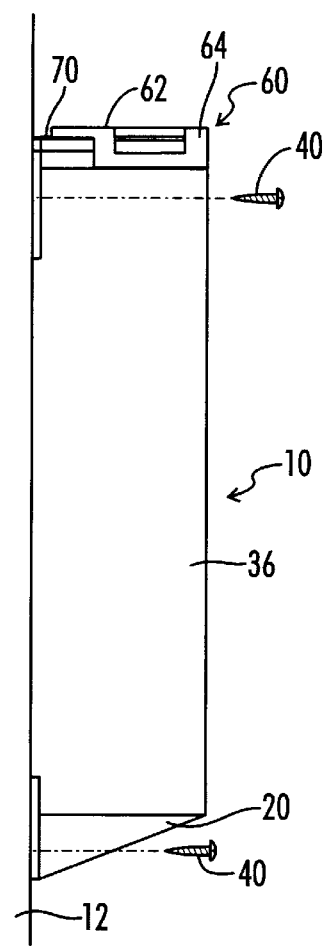
FIG. 28 is a left side view of the molded rail fence bracket apparatus with the rail retaining system apparatus of Applicant's invention showing the screw mounting to a post.

The rail slot extension 58 is molded with or attached to the back of the back piece 16 to allow for the bracket 10 to be properly placed against a post 12 which has a rail cutout 59. The rail slot extension 58 is designed to be the same size as the fence rail 14 that would otherwise be mounted against the post 12. The rail slot extension 58 provides support, strength, and proper positioning of the bracket 10 onto an extruded fence style of post. If an adhesive mounting system is used, then the rail slot extension 58 also will provide some additional gluing surface for the installation. Note that a further advantage of the rail slot extension 58 in combination with the back piece 16 is to provide a sealing engagement with the post 12 to properly cover the rail cutout 59 and discourage water or foreign element entry into the post 12. The attachment of the bracket 10 utilizing the rail slot extension 58 and screws 40 to a post is shown in FIGS. 27 through 29.

Figure 29:
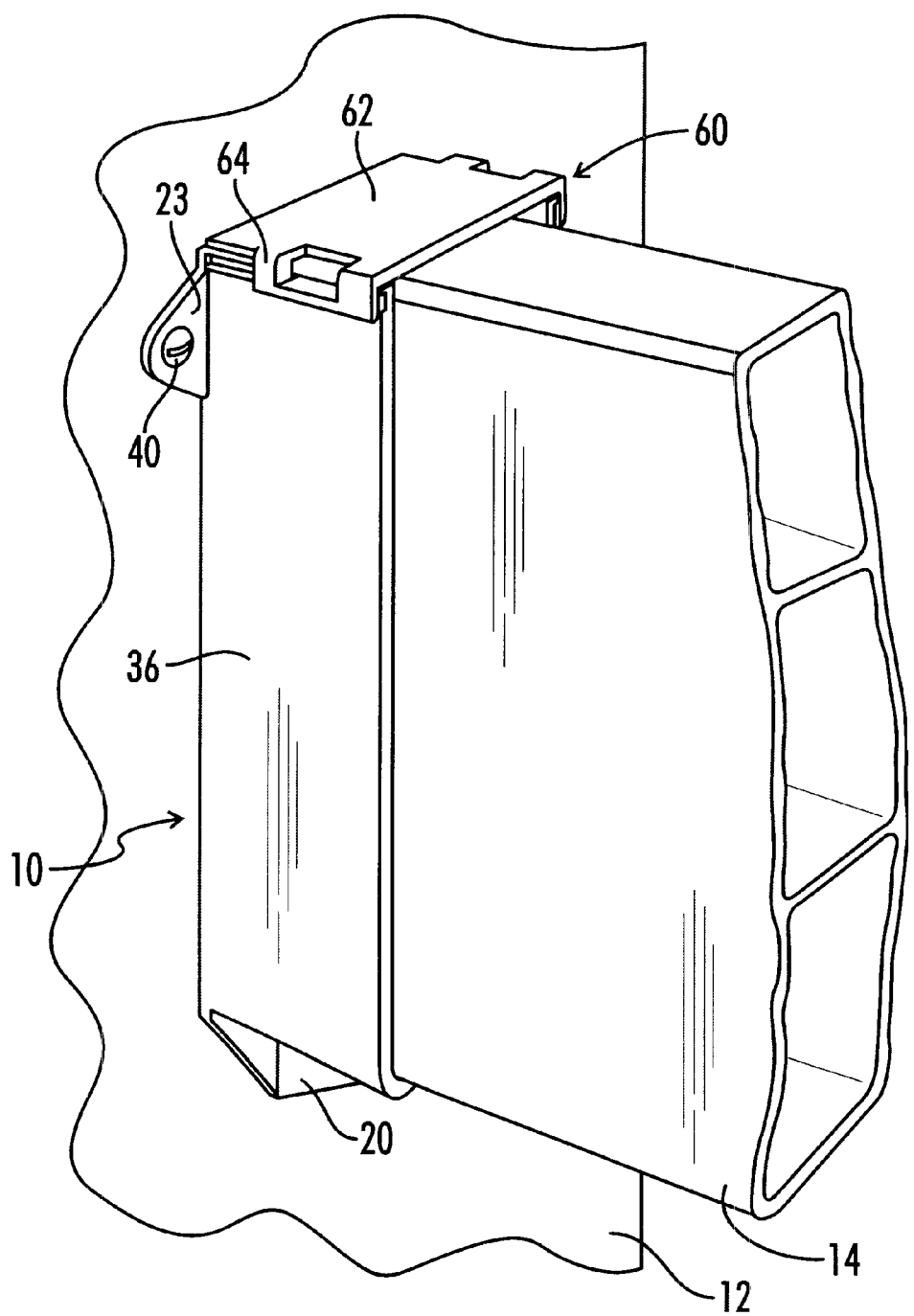
FIG. 29 is an isometric view of the molded rail fence bracket apparatus with the rail retaining system apparatus of Applicant's invention mounted to a fence post with an inserted rail with the rail retaining system in a closed position.
Figure 30:
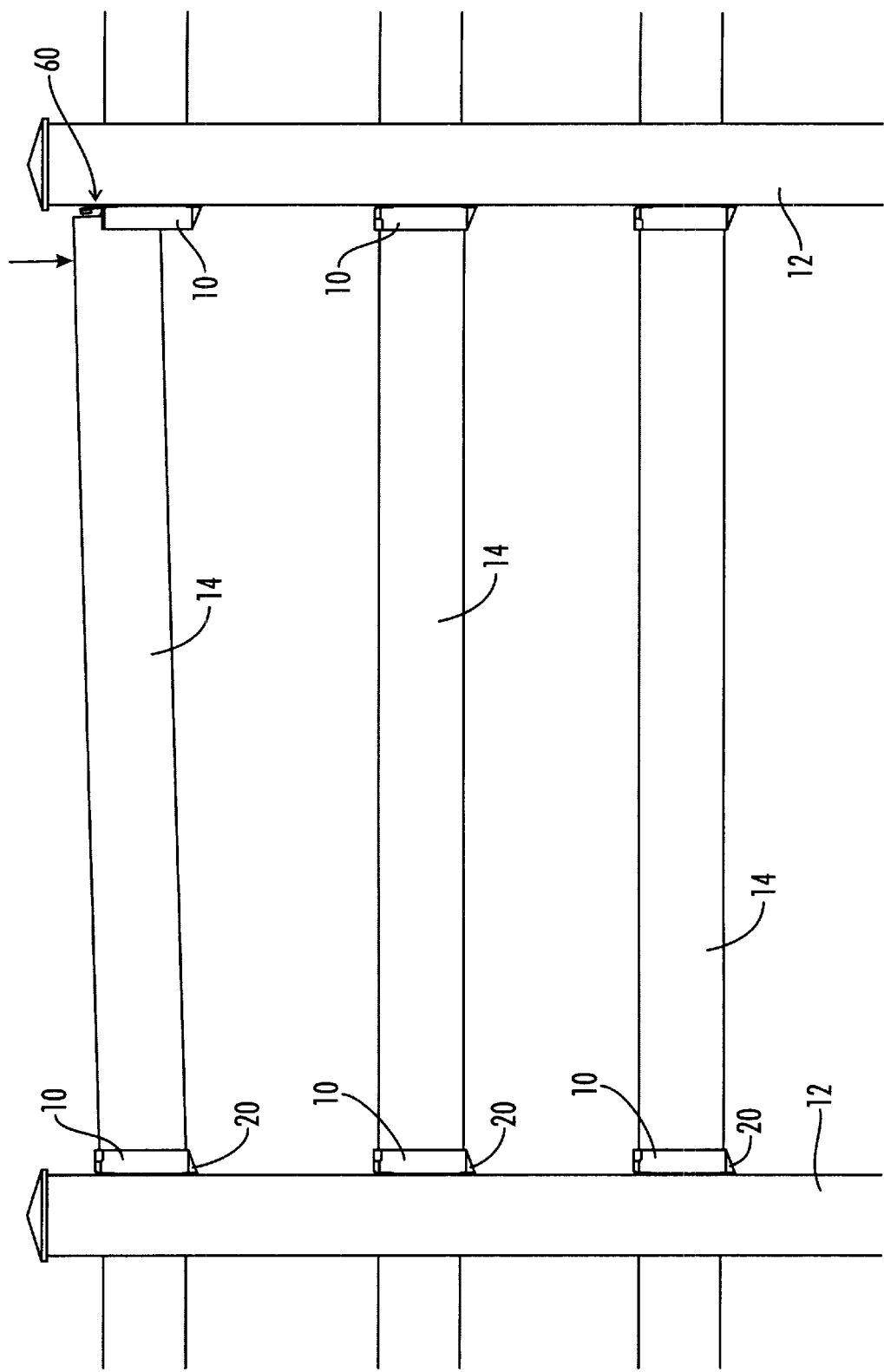
FIG. 30 is a front view of a fence section with multiple bracket apparatus mounted to fence posts to allow for a gate opening in a rail style fence.

FIGS. 29 and 30 show the extruded version of a rail 14 held in place by the rail retaining system apparatus 60. A shown in FIG. 30, multiple brackets 10 may be used to construct a section of fence. With these multiple brackets 10, the rail retaining system apparatus 60 on the brackets 10 may be opened and the rail 14 removed to allow for access through a section of fence. In this manner, the rail retaining system apparatus 60 is utilized to retain a fence rail 14 within the bracket 10 without requiring a fastener to be utilized to attach the rail 14 supported by the bracket 10.

Figure 20:
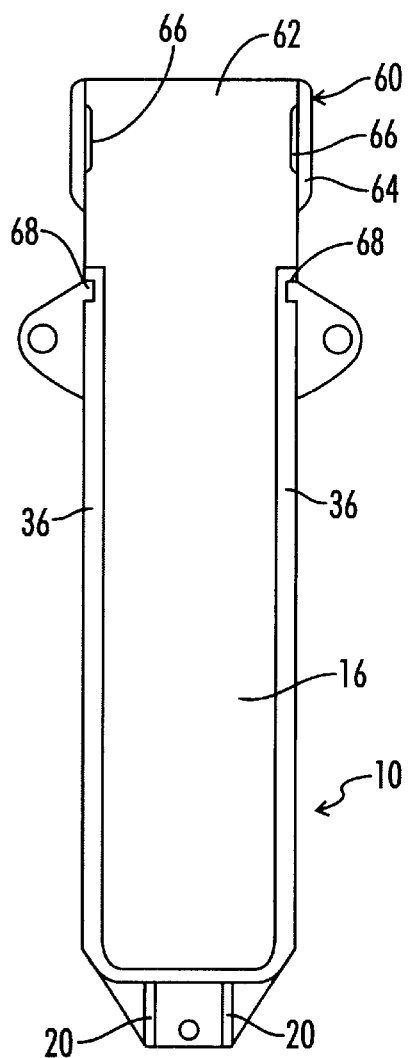
FIG. 20 is a front view of the molded rail fence bracket apparatus with the rail retaining system apparatus of Applicant's invention.
Figure 21:
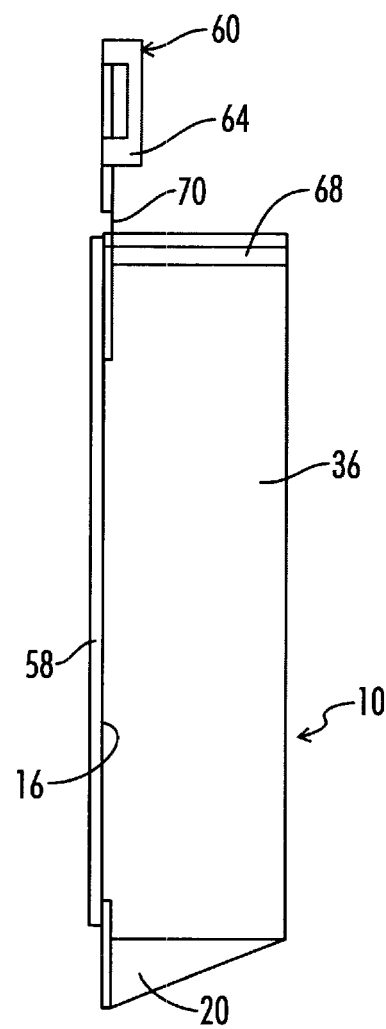
FIG. 21 is a left view of the molded rail fence bracket apparatus with the rail retaining system apparatus of Applicant's invention.
Figure 22:
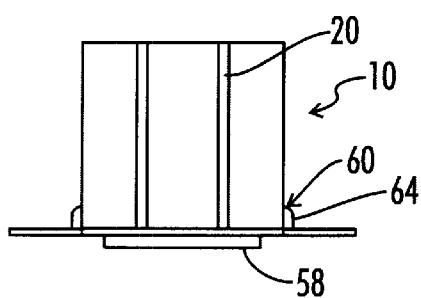
FIG. 22 is a bottom view of the molded rail fence bracket apparatus with the rail retaining system apparatus of Applicant's invention.

The rail retaining system apparatus 60 includes a top piece 62 with a locking system for retaining the rail 14. The locking system includes side flaps 64 with locking tabs 66 which fit into side slots 68 molded into the side pieces 36. The top piece 62 is attached to the back piece 16 by a thin flex strip hinge 70. As shown in FIG. 20 and FIG. 29, and FIG. 30, the top piece 62 spaces the side flaps 64 with the locking tabs 66 a sufficient distance apart to allow for a rail to be inserted or removed from the bracket 10.

Figures 23, 24, 25:
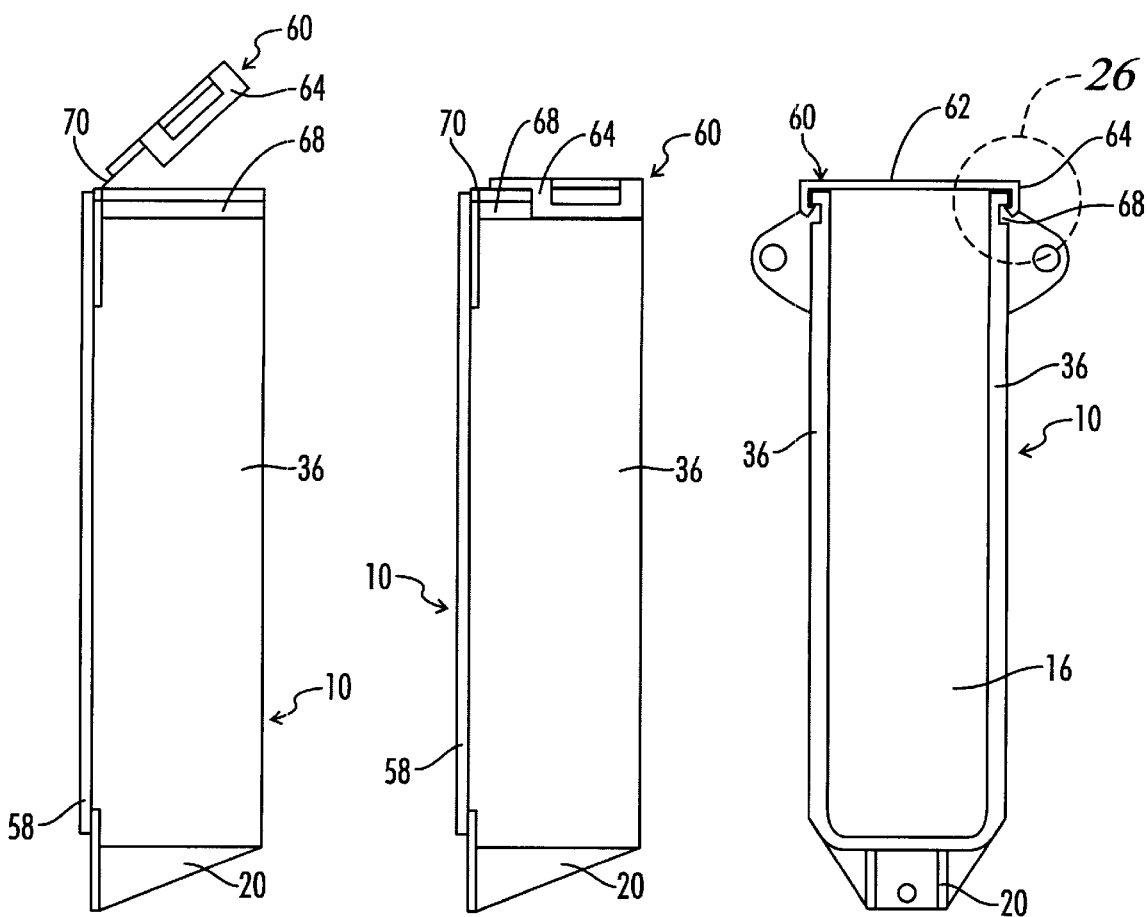
FIG. 23 is a left side view of the closing of the rail retaining system apparatus of Applicant's invention.
FIG. 24 is a left side view of the rail retaining system apparatus of Applicant's invention in a closed position.
FIG. 25 is a front view of the rail retaining system apparatus of Applicant's invention in a closed position.
Figure 26:
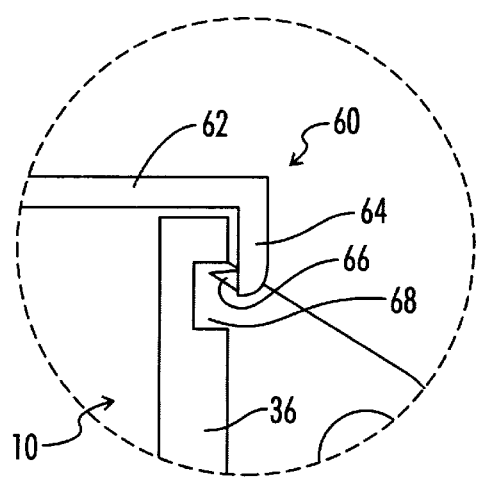
FIG. 26 is an exploded front view of the rail retaining system apparatus of Applicant's invention in a closed position.

For opening and closing the rail retaining system apparatus 60, the top piece 62 with the attached side flaps 64 is rotated about the flex strip hinge 70 as shown in FIGS. 23 and 24 to lock the top piece 62 to the side pieces 36. Once the locking tabs 66 encounter the side pieces 36, the top 62 flexes and allows for the side flaps 64 to extend outward and slide over the side pieces 36 and place the locking tabs 66 into the side slots 68. This holds the top piece 62 to the side pieces 36. Note that the side pieces 36 will not be able to flex inwardly because the rail 14 will occupy the inner space of the bracket 10. The top piece is kept from horizontal removal by the flex strip hinge 70 which is attached between the top piece 62 and the back piece 16. To remove the rail 14, the top piece 62 is merely flexed again to allow for the side flaps 64 to extend outward and let the locking tabs 66 slide out of the side slots 68 and over the side pieces 36. The top piece 62 may then be returned to its vertical position to allow for the rail 14 to be removed by sliding is out of the bracket 10 between the side pieces 36 and the side flaps 66.

Thus, although there have been described particular embodiments of the present invention of a new and useful Rail bracket, it is not intended that such references be construed as limitations upon the scope of this invention except as set forth in the following claims.

What is claimed is:

1. A fence bracket apparatus for supporting a rail, comprising:
   a back piece;
   a bottom piece attached to said back piece;
   an angle bracket attached to said back piece and said bottom piece;
   at least one side piece attached to said back piece and said bottom piece, each side piece including an interior wall and an exterior wall, each exterior wall defining a side slot; and
   a rail retaining apparatus including a locking system for retaining the rail, the locking system including
      a flexible top piece including at least one side flap positioned in association with each side piece, each side flap extending downward from the top piece, each side flap including an inward facing locking tab adapted to engage the side slot;
      a flex strip hinge connecting the top piece to the back piece
      wherein the rail retaining apparatus allows for a rail to be inserted into the bracket, the rail to be locked in place in the bracket by rotating the top piece with the attached side flaps about the flex strip hinge to lock the top piece to the side pieces by flexing the top piece as the locking tab encounters the side piece to allow the side flap to extend outward and slide over the side piece to place the locking tab into the side slot, and the rail to be unlocked from the bracket by flexing the top piece to allow for the side flaps to extend outward and allow the locking tabs to slide out of the side slots and over the side pieces, and the rail to be removed from the bracket by positioning the top piece in a vertical position to allow for the rail to be removed from the bracket by sliding the rail between the side pieces and the side flaps.

2. The apparatus of claim 1, further comprising:
   an offset spacer connected to at least one of the back piece and the bottom piece, the offset spacer adapted to allow for air circulation around the rail.

3. The apparatus of claim 1, the bottom piece including a curved surface adapted to support a rounded rail.

4. The apparatus of claim 1, further comprising:
   at least one of the back piece and the bottom piece defining a water passage opening adapted to allow water drainage from the apparatus.

5. The apparatus of claim 1, further comprising:
   a bottom-back fillet connected to the back piece and the bottom piece and adapted to provide additional support between the back piece and the bottom piece.

6. The apparatus of claim 1, further comprising:
   an upper bottom-back fillet connected to the back piece and the bottom piece and a lower bottom-back fillet connected to the back piece and the bottom piece.

7. The apparatus of claim 1, further comprising:
   a back-angle support fillet connected to the back piece and the angle bracket and adapted to provide additional support between the back piece and the angle bracket.

8. The apparatus of claim 1, further comprising:
   a side support fillet connected to the back piece and the side piece and adapted to provide additional support between the back piece and the side piece.

* * * * *